(12) United States Patent
Hatcher et al.

(10) Patent No.: US 8,080,679 B2
(45) Date of Patent: Dec. 20, 2011

(54) DIRECT CONVERSION OF BIOMASS TO BIODIESEL FUEL

(75) Inventors: Patrick G. Hatcher, Norfolk, VA (US); Zhanfei Liu, Norfolk, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 487 days.

(21) Appl. No.: 12/336,707

(22) Filed: Dec. 17, 2008

(65) Prior Publication Data
US 2009/0158638 A1 Jun. 25, 2009

Related U.S. Application Data

(60) Provisional application No. 61/015,926, filed on Dec. 21, 2007.

(51) Int. Cl.
*C11C 1/00* (2006.01)
(52) U.S. Cl. .......................................... 554/167; 44/308
(58) Field of Classification Search .................... 44/308; 554/167
See application file for complete search history.

(56) References Cited

U.S. PATENT DOCUMENTS

| | | | |
|---|---|---|---|
| 4,845,289 A | 7/1989 | Ries et al. | |
| 5,354,878 A | 10/1994 | Connemann et al. | |
| 5,525,126 A | 6/1996 | Basu et al. | |
| 6,350,890 B1 * | 2/2002 | Kiy et al. | 554/167 |
| 6,855,838 B2 | 2/2005 | Haas et al. | |
| 6,965,044 B1 | 11/2005 | Hammond et al. | |
| 2007/0048848 A1 | 3/2007 | Sears | |
| 2008/0034645 A1 | 2/2008 | Bressler | |
| 2008/0155888 A1 | 7/2008 | Vick et al. | |
| 2008/0160593 A1 | 7/2008 | Oyler | |
| 2008/0244961 A1 | 10/2008 | Rusek et al. | |
| 2008/0274022 A1 | 11/2008 | Boykin et al. | |
| 2008/0282606 A1 | 11/2008 | Plaza et al. | |

FOREIGN PATENT DOCUMENTS

GB 674870 7/1952
(Continued)

OTHER PUBLICATIONS

High quality biodiesel production from a microalga Chlorella protothecoides by heterotrophic growth in fermenters by Xu et al., Journal of Biotechnology, Elsevier Science Publishers, Amsterdam, NL, vol. 126, No. 4-Dec. 1, 2006, pp. 499-507, XP005720319—ISSN: 0168-1656 abstract.

(Continued)

*Primary Examiner* — Deborah D Carr
(74) *Attorney, Agent, or Firm* — Young Basile

(57) ABSTRACT

Disclosed is the direct conversion process for producing biodiesel from a biomass. The direct conversion process for producing biodiesel from a biomass comprises reacting a feed stock comprising a biomass and an alkylation reagent in a substantially oxygen free environment at a temperature sufficient to hydrolyze one or more lipid glycerides in the biomass and alkylated one or more fatty acids in the reaction. The process may comprise reacting a feed stock comprising an algal biomass and tetramethylammonium hydroxide in a substantially oxygen free environment at a temperature between 250° C. and 500° C. The direct conversion process for producing biodiesel may further comprise reacting oil containing lipid glycerides with an alkylation reagent at a sufficient temperature to esterify the oil. The fatty acid alkyl esters produced from the reacted feed stock are recovered. The recovered fatty acid alkyl esters, as an essential component of biodiesel, may be formulated into biodiesel.

28 Claims, 3 Drawing Sheets

FOREIGN PATENT DOCUMENTS

| WO | WO 2004031119 A1 * | 4/2004 |
| WO | WO20040131119 A1 | 4/2004 |
| WO | WO 2007061325 A1 * | 5/2007 |
| WO | WO2007061325 A1 | 5/2007 |

OTHER PUBLICATIONS

International Search Report for PCT/US2008/087115 dated Mar. 27, 2009.

http://biopact.com/2007/01/in-depth-look-at-biofuels-from-algae.html "In-Depth Look at Biofuels From Algae".

John Sheehan, Terri Dunahay, John Benemann, Paul Roessler, a look Back at the U.S. Department of Energy's Aquatic Species Program—Biodiesel from Algae, Prepared by: the National Renewable Energy Laboratory; 1617 Cole Boulevard, Golden, CO , A national laboratory of tyhe U.S. Department of Energy Operated by Midwest Research Institute Under Contract No. DE-AC36-83CH10093.

* cited by examiner

DIRECT CONVERSION OF BIOMASS TO BIODIESEL FUEL

CROSS-REFERENCE TO RELATED APPLICATION

This application claims priority of Provisional Patent Application Ser. No. 61/015,926 filed on Dec. 21, 2007 and incorporated herein by reference in its entirety.

FIELD OF THE INVENTION

The present invention relates in general to a process of producing biodiesel directly from a biomass. In particular, the invention relates to a process of producing fatty acid alkyl esters directly from a biomass using an alkylation reagent.

BACKGROUND

The recent emphasis on finding alternative energy sources to fuel the energy needs of the United States and the world is leading to an accelerated search for new fuels or new sources of fuel. Producing a liquid fuel from biomass, or biofuel, is an important focus of many alternative energy strategies. Ethanol production from plant biomass is one example of this. Another example of a newer fuel is biodiesel. Refined vegetable oils have been the typical starting materials for the production of biodiesel. Biodiesel can be produced from the oils of many plants. Biodiesel is an alternative, non-toxic, biodegradable and renewable diesel fuel. These characteristics of biodiesel reduce the emission of carbon monoxide, hydrocarbons, and particulate matter in the exhaust gas compared to diesel fuel.

Biodiesel is commonly referred to as fatty acid methyl esters (FAMEs) which are usually obtained from oils extracted from soybean, sunflower, rapeseed or even waste cooking oil. Biodiesel production relies on a chemical reaction called transesterification that transforms esters such as triglycerides into mono alkyl esters. Conventionally, this reaction requires a large excess of methanol, or in some cases ethanol, and an acid or a base catalyst under heated conditions.

In practice, the commercial production of biodiesel from plant feedstocks involves a multi-step process that is time-consuming and not necessarily economically attractive. Triglycerides in oils have been esterified in a multi-step process using acidic or alkaline catalysts. The amount and type of catalyst necessary has varied widely depending upon free triglyceride content of the oil. Initially, the oil feedstock must be extracted. The oil extraction step is typically done in a variety of ways. Oil from plant material may be extracted by lysing and separating, crushing, and centrifuging. The oil may be expressed with rollers, then separating the oil and discarding the residual organic material. Oil can be extracted using chemicals. Benzene, ether and hexane have been used, with the downside to using such solvents being the dangers involved in working with the chemicals. Enzymatic extraction and osmotic shock are other methods that may be used. The oil is blended with an alcohol such as methanol, an acidic or alkaline catalyst is added, and the blend is then heated and cooled. In the transesterification, an acidic or alkaline catalyst is added to the oil with anhydrous methanol to carry out the reaction. This multi-step process is required because a feedstock having a free fatty acid concentration, when exposed to an alkaline catalyst, produces a high concentration of soap. Additional steps are typically required to remove the catalyst residue and strip off the lower alcohols.

SUMMARY OF THE INVENTION

Disclosed herein are direct conversion processes for producing fatty acid alkyl esters from a biomass. The recovered fatty acid alkyl esters as an essential component of biodiesel can be formulated into biodiesel. Therefore, the processes of the invention are useful for producing biodiesel from a biomass.

A first embodiment of the direct conversion process for producing biodiesel from a biomass comprises reacting a feed stock comprising a biomass and a alkylation reagent in a substantially oxygen free environment at a temperature sufficient to hydrolyze one or more lipid glycerides in the biomass and alkylated one or more fatty acids in the reaction. The fatty acid alkyl esters produced from the reacted feed stock are recovered.

A second embodiment of the direct conversion process for producing biodiesel from a biomass comprises reacting a feed stock comprising an algal biomass and tetramethylammonium hydroxide in a substantially oxygen free environment at a temperature between about 250° C. and about 500° C. The reaction comprises hydrolyzing one or more lipid glycerides in the algal biomass and methylating one or more fatty acids as they are produced in the reaction. The fatty acid methyl esters produced from the reacted feed stock are recovered.

A third embodiment of the direct conversion process for producing biodiesel comprises reacting oil containing lipid glycerides with an alkylation reagent at a sufficient temperature to esterify the oil. The reaction occurs in a substantially oxygen free environment. The fatty acid alkyl esters are recovered from the esterified oil.

BRIEF DESCRIPTION OF THE DRAWINGS

The description herein makes reference to the accompanying drawings wherein like reference numerals refer to like parts throughout the several views, and wherein:

FIG. 2A shows the yield compared to temperature, and FIG. 2B shows the yield compared to amount of tetramethylammonium hydroxide.

DETAILED DESCRIPTION OF EMBODIMENTS OF THE INVENTION

Disclosed herein is a process for directly converting biomasses of algae and other plant feedstocks to biodiesel fuel. The one-step process involves thermochemolysis with a single alkylation reagent at a sufficient temperature under substantially oxygen-free conditions and at ambient pressures. Also disclosed is a process for conversion of glycerides to biodiesel with a single alkylation reagent at slightly elevated temperatures under substantially oxygen-free conditions and at ambient pressure.

As used herein, "biodiesel fuel" refers to any fuel, fuel additive, aromatic and aliphatic compound derived from a biomass disclosed herein. As used herein, "reaction" is intended to cover single step and multi-step reactions which can be direct reactions of reactants to products or may include one or more intermediate species which can be either stable or transient.

Figure 1:
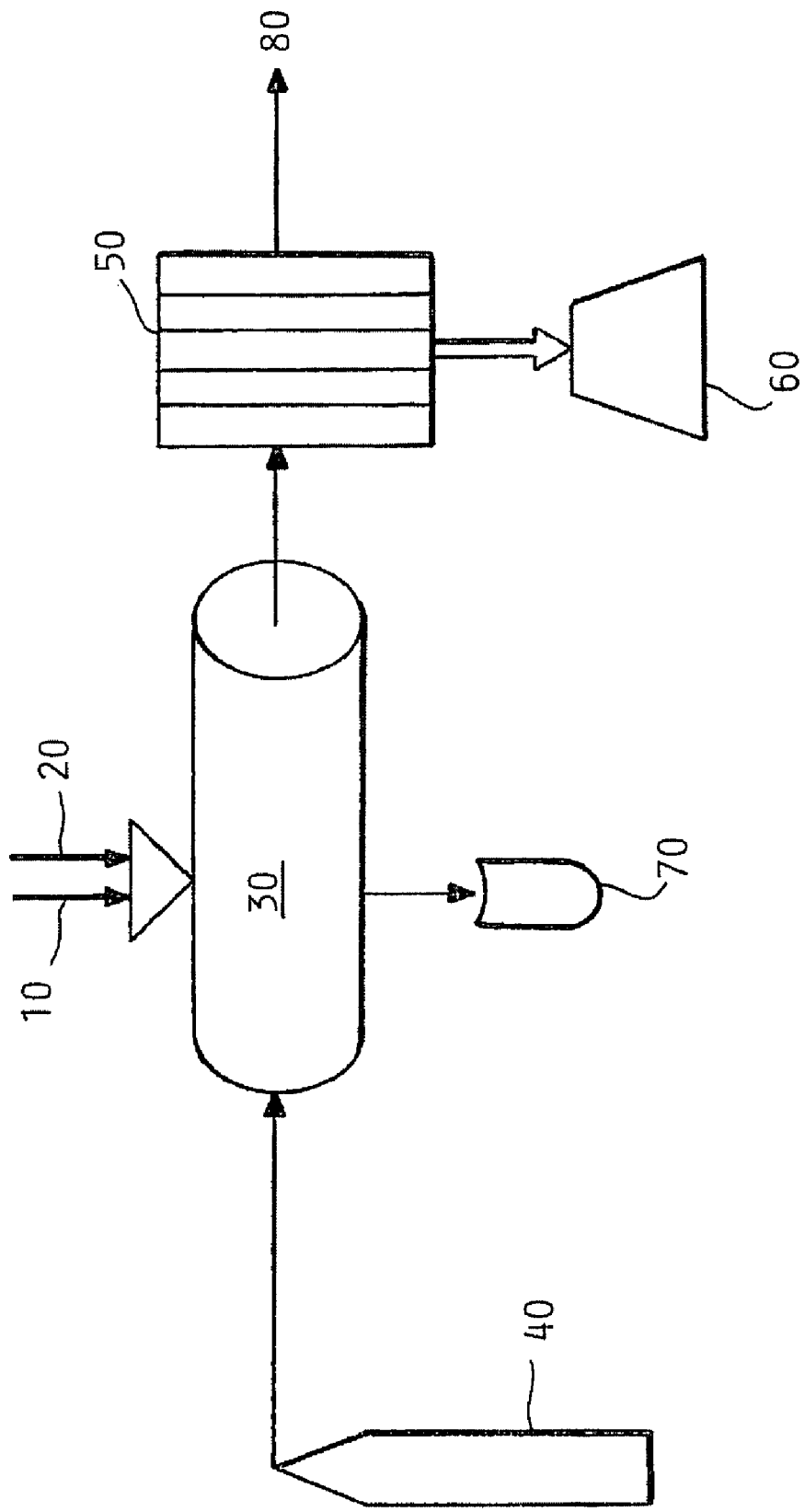
FIG. 1 is a schematic diagram of an embodiment of the conversion process.

An embodiment of the direct conversion of biomass to biodiesel fuel is depicted in FIG. 1. The reactor feed stock comprises a dried or partially dried biomass 10 and an alkylation reagent 20. The feed stock can be mixed and loaded into a reactor 30. The reactor 30 has temperature control (not shown) to maintain the reactor 30 at a desired temperature. Inert gas 40 flows through the reactor to maintain a substantially oxygen free environment. At the desired temperature, transesterification occurs. The lipid triglycerides of the dried or partially dried biomass 10 are hydrolyzed and the fatty acids are alkylated, directly producing fatty acid alkyl esters (FAAEs), the essential biodiesel component. The following is the general reaction equation:

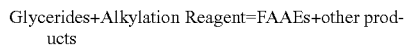

The volatile FAAEs produced in the reaction are recovered. In this embodiment, recovery is shown via a condenser 50. The FAAEs are recovered as biodiesel 60 by well-known methods such as condensation. Byproducts such as glycerol, water or other water soluble compounds are separated by density in the reactor 70 or by either density or volatility in the condenser 80.

The individual elements of the process will now be described in detail.

As used herein, "biomass" means material harvested from a plant or plants. Depending on the particular plant or plants, the harvested material is used directly as reactor feedstock or processed further by well-known methods to convert it into reactor feedstock. For example, algae can be used directly, partially dried, completely dried, or dried and partially reconstituted in water. It is contemplated that alkylation efficiency is positively correlated to the surface areas of the biomass available to the chemical reactions taking place during the processes disclosed herein. In this regard, algae can be directly used because they are single-celled and have very high available surface area. Higher level plants such as soybean pods may be chopped and/or crushed into a fine powder, for example, prior to introduction into the processes disclosed herein, in order to increase the available surface area. It is recognized that for each type of plant processed, the processing can be optimized for higher yields of fatty acid alkyl esters from the processes disclosed herein. It is also recognized that more than one plant, or biomass from a plant, can be used as feedstock to the reactor. The biomasses can be mixed before introduction introduced individually into the reactor to be reacted together. It is also contemplated that one individual type of biomass can be the feedstock.

Methods for determining the content of one or more fatty acid alkyl esters in a mixture are well known in the art and otherwise set forth herein. See, for example, the references U.S. Pat. Nos. 5,525,126; 6,855,838; and 6,965,044 and U.S. Patent Application Publication Nos. 2007/0048848 and 2003/0158074. Accordingly, the yield of one or more fatty acid alkyl esters resulting from the processes disclosed herein can be readily determined, alone or in combination with one or more well-known methods, such as those described in the cited references.

The biomass may comprise plants that have been conventionally studied in an effort to obtain biodiesel from the extracted oil. Non-limiting examples of such plants are corn, sunflower, olive, soybeans, rapeseed, wheat, sugar beet, sugar cane, jatropha, palm, sorghum, cassava, hemp, algae and the like. Dried or partially dried biomasses of such plants can be used in the embodiments herein. These plants contain the oily glycerides necessary for the direct conversion. Such plants also include those described in U.S. Pat. Nos. 5,525,126; 6,855,838; and 6,965,044 and U.S. Patent Application Publication Nos. 2007/0048848; and 2003/6158074.

In particular, algae are contemplated as a biomass feed stock. Microalgae, prevalent in both fresh and marine waters, are remarkable and efficient biological factories capable of producing substantially more lipids than most typical land plants. For example, *Botryococcus braunii*, a strain of green microalgae, contains around 30-45% of oil content in their dried biomass. Algal culturing requires significantly less land than other plant feed stocks, which can affect agricultural production. Microalgae are capable of producing about thirty times the amount of oil per unit area of land, compared to terrestrial crops. The per unit area yield of oil from algae is estimated to be from between 5,000 to 20,000 gallons per acre, per year (4.6 to 18.4 l/m$^2$ per-year); this is 7 to 30 times greater than the next best crop, Chinese tallow (699 gallons). See *An in-depth look at biofuels from algae*, Jan. 19, 2007, http://biopact.com/2007/01/in-depth-look-at-biofuels-from-algae.html and John Sheehan, Terri Dunahay, John Benemann, Paul Roessler "*A look back at the U.S. Department of Energy's Aquatic Species Program: Biodiesel from Algae,*" Close-out Report, U.S. Dept. of Energy (July 1998). Due to the high growth efficiency of microalgae, the microalgae can efficiently recycle the inorganic carbon released from the petroleum combustion. For these reasons, algae are an ideal source from which to produce biodiesel.

The biomass may be used wet, but it is recognized that drying increases the yield of FAAEs. Even though dried algae may be an ideal choice to feed the reactor considering the ease of use and probable higher biodiesel production, the drying procedure, takes time. The drying procedure may also require energy if freeze-drying is used. Lipids can also be degraded if the algal matter is left exposed to air too long.

The dried or partially dried biomass 10 is fed to the reactor 30 by means well-known in the art. The biomass 10 may be conveyed, augured or sprayed, for example. The reactor 30 may be of any type known in the art that can operate at the temperatures required. The configuration of the reactor 30 in FIG. 1 is not consequential and is only an example of reaction chambers that may be utilized.

Transesterification occurs in the reactor 30. Transesterification is the process of exchanging the alkoxy group of an ester compound with another alkoxy group. The biomass contains glycerides that undergo hydrolysis in the reactor during transesterification. The glycerides may be mono-, di- or triglycerides. The ester links are severed during hydrolysis, producing free fatty acids.

The transesterification process continues with the alkylation of the freed fatty acids. Methylation in particular refers to the alkylation process used to describe the delivery of a CH$_3$ group. A non-limiting example of an alkylation reagent 20 used in the embodiments disclosed herein is tetramethylammonium hydroxide (TMAH). Other non-limiting suitable alkylation reagents include tetrabutylammonium hydroxide, trimethylphenylammonium hydroxide, tetramethylammonium hydroxide, (m-trifluoromethylphenyl)trimethylammonium hydroxide, mixtures thereof and the like.

TMAH is a quaternary ammonium salt that can transesterify the biomass in one step. It can hydrolyze triglycerides and methylate the fatty acids simultaneously at the proper temperature, thus directly producing fatty acid methyl esters, or FAMEs, the essential biodiesel component. The by-products may include glycerol, water, trimethylamine, methanol or other water soluble compounds that can be easily separated by density or volatility. TMAH thermally decomposes to trimethyl amine plus methanol in the following equation:

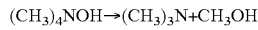

The trimethyl amine (TMA) by-product to which the TMAH is converted may be recycled and converted back to TMAH. As an example, the TMA can be reacted with methyl chloride gas in water to produce tetramethylammonium chloride (TMAC) as disclosed in U.S. Pat. No. 4,845,289. Methanol reacts with hydrochloric gas to produce methyl chloride and the methyl chloride reacts with TMA to produce TMAC. The TMAC can be passed through an anion exchange resin (OH form) to convert the TMAC to TMAH. Other byproducts may also be recovered and recycled or used in downstream processes. For example, the glyceryl backbone of the glycerides can be methylated to produce triglyme, a commercially usable product. Other byproducts may also be recovered and recycled or used in downstream processes.

Figure 2A:
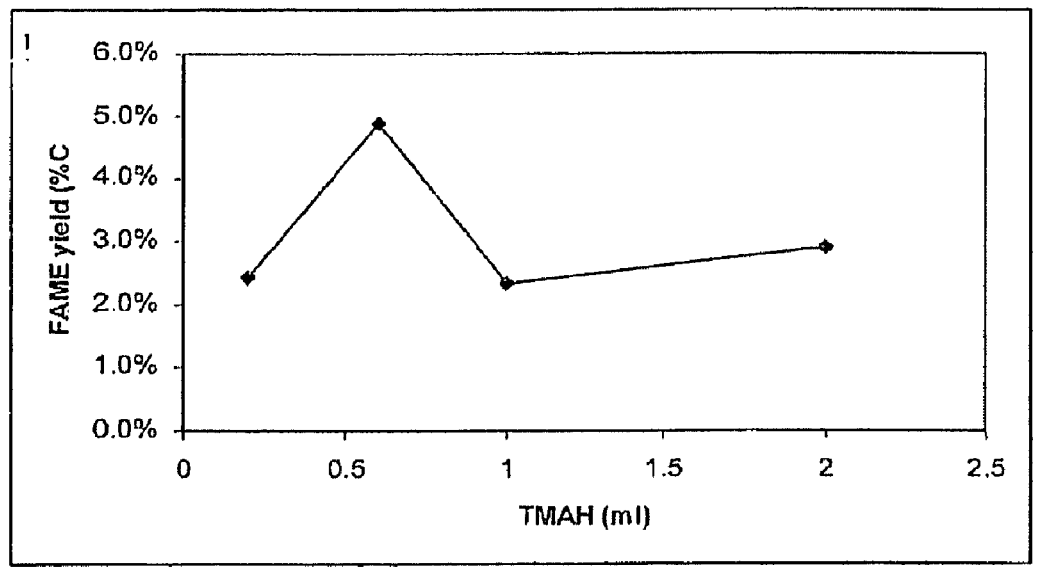
FIGS. 2A and 2B show the fatty acid methyl ester yield.

FAAE yields are affected by the amount of alkylation reagent added to the reactor. FIG. 2A depicts the FAME yield based on differing amount of the methylation reagent TMAH added to the reactor feed stock. The results indicate in FIG. 2A that 0.6 ml of the TMAH used, which as TMAH in 25% methanol, is equivalent to 0.12 g TMAH, yielded 5% FAME. As indicated, greater or lesser quantities of TMAH produced lower yields. These yields were determined using one gram of dried algal biomass.

The transesterification takes place in a substantially oxygen free environment. As used herein, "substantially oxygen free environment" means that the oxygen content of the gaseous environment of a reaction, such as the transesterification reaction in the processes disclosed herein, is reduced compared to the oxygen content of air. Thus, substantially oxygen free environment contemplates any amount of such reduction, including reduction of the oxygen to non-detectable levels. In this regard, substantially oxygen free environment also contemplates that there may be residual oxygen remaining in the system. To achieve the substantially oxygen free environment, the reactor can be purged with an inert gas using well known means to reduce oxygen. Oxygen may also be reduced by preheating the reactor to the operating temperatures, thereby burning off the oxygen in the system. It is contemplated that the reduction in the oxygen is positively correlated to the amount of desired fatty acid alkyl ester yield. Thus, maximum reduction in the oxygen content results in higher yields of fatty acid alkyl ester. The optimal amount of the reduction of oxygen is determinable by monitoring the fatty acid alkyd ester yield from the processes of the invention by the methods described herein. In other words, the desired yield can be compared under any substantially oxygen free environment and compared to the yield of transesterification under air. In one embodiment, the oxygen content of the gaseous environment of the transesterification reaction is selected from less than: 20%, 19%, 18%, 17%, 16%, 15%, 14%, 13%, 12%, 11%, 10%, 9%, 8%, 7%, 6%, 5%, 4%, 3%, 2%, 1% and undetectable amounts of the total. In another embodiment, the oxygen content is selected from less than 5%, 4%, 3%, 2%, 1% and undetectable amounts of the total. In another embodiment, the oxygen content is selected from less than 2% of the total. In another embodiment, the oxygen content is essentially zero, meaning it is undetectable.

The transesterification takes place under ambient pressure conditions. This reduces the cost of the process and increases the simplicity of the process. However, it is contemplated that the pressure can be reduced to less than ambient, allowing for a further reduction in operating temperature. It is also contemplated that the pressure may be increased to allow for a more efficient control of reactor conditions and product collection. The optimal amount of the reduction in pressure and/or temperature is determinable by monitoring the fatty acid alkyl ester yield from the processes of the invention by the methods described herein.

Figure 2B:
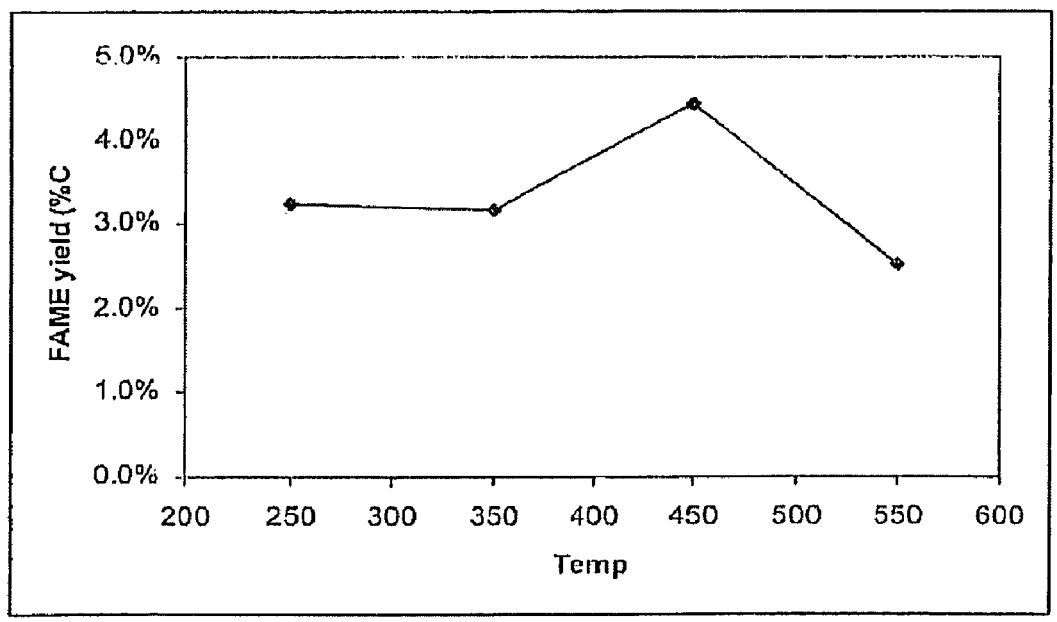

The transesterification occurs at a temperature sufficient to hydrolyze one or more lipid glycerides in the biomass and alkylate one or more fatty acids in the reaction. Referring now to FIG. 2B, the yield of FAMEs produced from this process using an algal biomass as a feed stock is graphed against the temperature at which the reaction was run. The results indicate that the yields of FAMEs produced at temperatures of 250 and 350° C. were about the same, approximately 3.2%. The yield was the highest (4.43%) at 450° C., and the lowest at 550° C. The low yield at 550° C. indicates that some of the FAMEs might be degraded at the higher temperature. It should be noted that although 450° C. achieves the optimum biodiesel yield in this particular process embodiment and at atmospheric conditions, lower temperatures may be used to provide suitable yields under different conditions, such as at pressures below atmospheric. Further, economics and energy requirements may make a lower temperature more favorable depending on the associated product yield. It should be noted that product yield, measured by methods discussed herein, may be optimized by varying at least one of temperature, pressure, and oxygen level. Therefore, in one embodiment, it is contemplated that temperatures as low as 100° C. will produce the desired yield when at least one of pressure and oxygen level is adjusted. In another embodiment, the temperature is selected from the following ranges: 100° C. to 550° C.; 150° C. to 500° C.; 200° C. to 450° C.; 250° C. to 400° C.; and 300° C. to 350° C.

A second embodiment of the process of direct conversion to biodiesel fuel is described below. The second embodiment is similar to the first embodiment. Therefore, descriptions of like steps and elements will not be repeated.

The reactor feed stock of the second embodiment comprises a glyceride based oil and an alkylation reagent. The feed stock is mixed and loaded into a reactor. The reactor has temperature control (not shown) to maintain the reactor at a desired temperature. Inert gas sweeps the reactor to maintain a substantially oxygen free environment. At the desired temperature, transesterification occurs. The glycerides of the feed stock oil are hydrolyzed and the fatty acids are alkylated, directly producing FAAEs.

The glyceride based oil may be of plants or plant biomasses that have been conventionally studied in an effort to obtain biodiesel. Non-limiting examples of such plants are corn, soybeans, sunflower, olive, rapeseed, wheat, sugar beet, sugar cane, jatropha, palm, sorghum, cassava, hemp, algae and the like. The oil is extracted from the plants or biomasses by conventional means known to those skilled in the art.

During transesterification, the glycerides of the oil undergo hydrolysis in the reactor during transesterification. The glycerides may be mono-, di- or triglycerides. The ester links are severed during hydrolysis, producing free fatty acids.

The transesterification process continues with the alkylation of the freed fatty acids. One alkylation reagent that can be used in the embodiments disclosed herein is tetramethylammonium hydroxide (TMAH). However, it is to be understood that the alkylation reagent is not limited to TMAH and may be other suitable alkylation reagents, examples of which include tetrabutylammonium hydroxide, trimethylphenylammonium hydroxide, tetraethylammonium hydroxide, (m-trifluoromethylphenyl)trimethylammonium hydroxide and the like.

TMAH hydrolyzes the glycerides and methylates the fatty acids simultaneously at the proper temperature, following the same reaction equation disclosed in reference to the first embodiment. The by-products may include glycerol, water, trimethyl amine, methanol or other water soluble compounds that can be easily separated by density or volatility. The trimethylamine by-product to which the TMAH is converted may be recycled and converted back to TMAH as described above. Other byproducts may also be recovered and recycled or used in downstream processes.

The reaction of the second embodiment occurs in the substantially oxygen free environment at ambient pressure and sufficient temperature, as discussed in reference to the first embodiment. The volatile FAMEs are recovered with the same means discussed above.

EXAMPLES

Examples are presented below. The examples are intended only to further illustrate the embodiments disclosed herein and are not intended to limit the scope of the invention as defined by the claims.

An algal biomass was collected from the effluent of a local wastewater treatment facility. This algae sample, dominated by diatoms as detected under microscope, was collected from the surface of the water and air dried. Another algal sample was collected from a local lake using ultrafiltration. Briefly, 60 L of water from the lake was concentrated to about 60 mL using tangential flow filtration with a 0.2 µm membrane. The concentrated algae sample was freeze dried. This sample consisted mainly of Pennate diatoms and *Cryptomonas* sp, as observed under a microscope.

To prepare the algae for the chemoreactor, 1-2 grams of dried algae was mixed with 1 ml TMAH (25% in methanol). It should be noted that TMAH (25% in water) can also be used. Tests indicate the yield with TMAH in methanol is higher than that with distilled water, suggesting that both the TMAH and methanol are directly involved the alkylation process. It is contemplated that with the use of water, a portion of the water is methylated to form methanol.

TMAH and FAME standards were obtained from Sigma. The mixture was evaporated to near dryness or dryness under nitrogen over a period of 2 hours and was loaded into an appropriate heating furnace (reactor) that may be programmed or set for temperature control. The reactor used was manufactured by Thermo Electron, model Lindberg Blue M, PF55035A-1. The temperature was ramped from room temperature to 450° C. in 15 min. and then was held for 30 min before cooling down to room temp. Nitrogen swept the reactor and condenser at ambient pressure at a flow rate of 20 ml/min. The volatile products including the biodiesel were condensed using an ice-cold trap (condenser). The top layer of the condensed fluid in the trap can be taken directly as the biodiesel product.

After being filtered through glass wool, the biodiesel collected from the chemoreactor was injected into Gas chromatography coupled to time-of-flight mass spectrometry GC-TOF MS (LECO Pegasus III) using the splitless mode. The analyses were carried out with an autosampler (CTC Analytics) integrated to the GC system (Agilent Technologies, 6890N) fitted with a 30 m×0.25 mm i.d. capillary column (0.25 µm film of 5% diphenyl-95% dimethyl polysiloxane). Helium gas was used as a carrier gas, and the temperature was ramped from 50 to 300° C. at 15° C. min$^{-1}$ following injection. The select mass ion m/z 74 was used to quantify the amount of FAME in the samples based on both internal and external standards; added (tetracosane) according to Frazier S. W., Nowack K. O., Goins K. M., Cannon F. S., Kaplan L. A., and Hatcher P. G., *Characterization of organic matter from natural waters using tetramethylammonium hydroxide thermochemolysis GC-MS*, J. ANALYTICAL & APPLIED PYROLYSIS, 70(1), 99-128 (2003). Using the direct conversion process disclosed herein in the chemoreactor, FAME content from the algal biomass sample is about 3% of biomass. This yield is comparable with the conventional fatty acid analysis of microalgal samples, suggesting an excellent efficiency for biodiesel transformation. See Mansoui M. P., Frampton D. M. F., Nichols P. D., Volkman J. K., Blackburn S. I., *Lipid and fatty acid yield of nice stationary-phase microalgae: Applications and unusual C24-C28 polyunsaturated fatty acids*, J. OF APPLIED PHYCOLOGY, 17, 287-300 (2005).

Figure 3A:
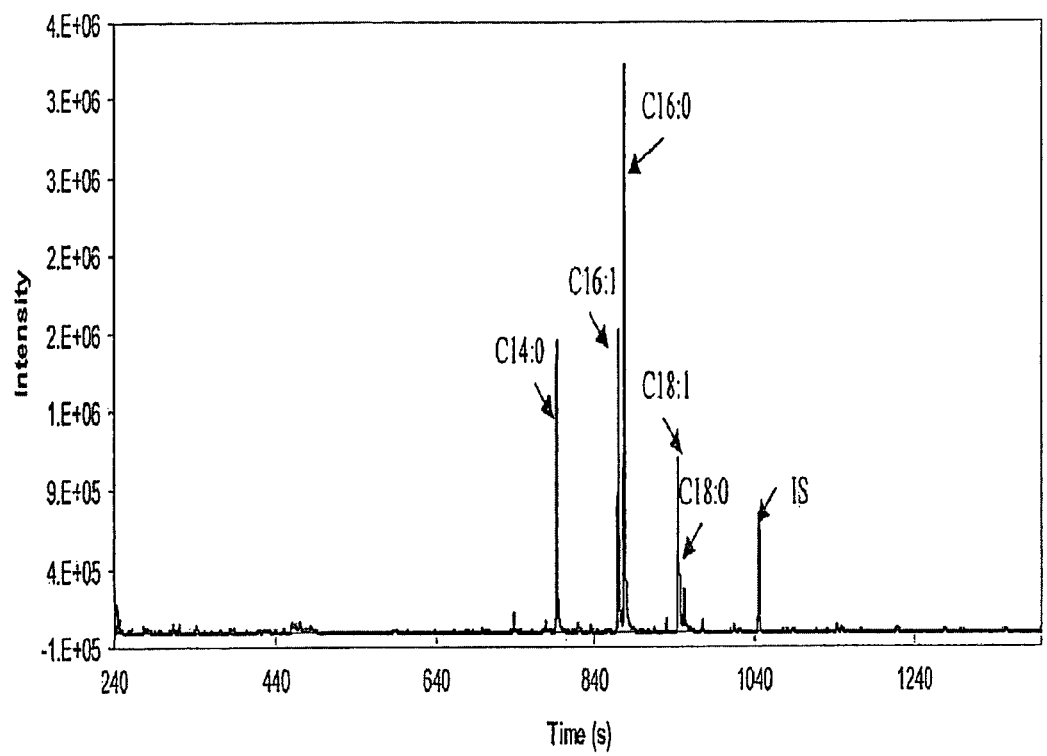
FIGS. 3A and 3B show GCTOF-MS ion chromatograms of biodiesel from an algal sample and biodiesel from soybean oil, respectively.
Figure 3B:
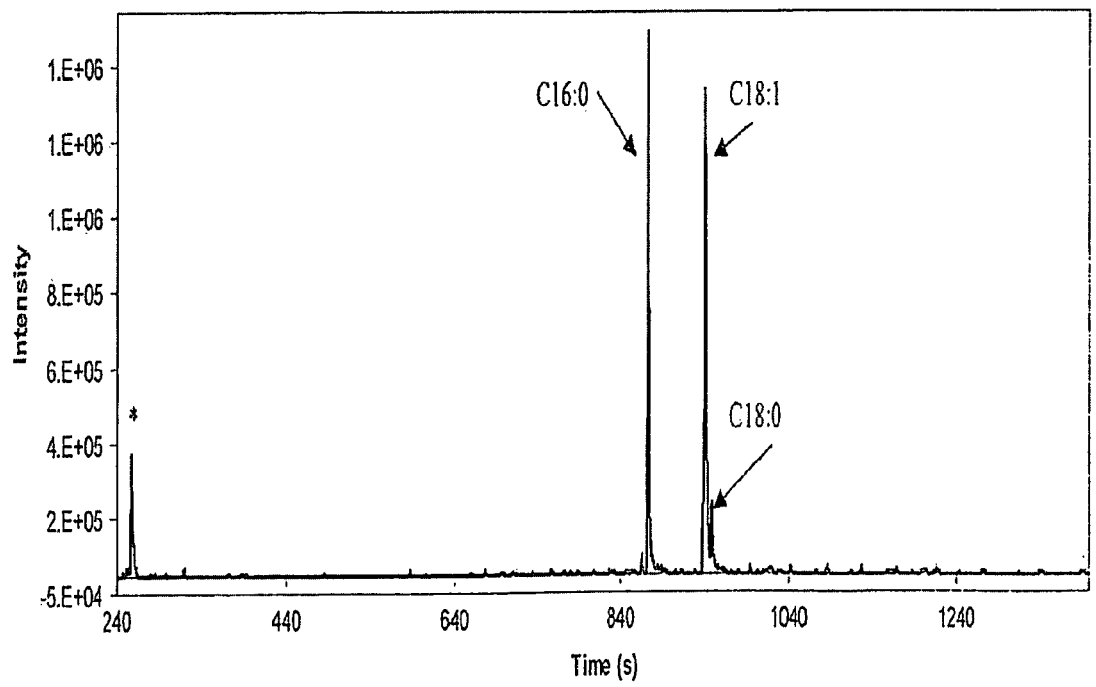

A comparison was done of the biodiesel derived from the algal biomass with biodiesels derived from other plants and supplied commercially. The gas chromatography coupled to time-of-flight mass spectrometry (GC-TOF MS) was used to compare the chemical constituents in biodiesel products from the algal biomass with two biodiesel standards available commercially from Houston Biodiesel. One of the biodiesel samples was made from palm oil (palmitic acid), and the second one was made from soybean and chicken oil. Both the palm oil and soybean oil biodiesels were produced using the conventional transesterification involving sodium hydroxide and methanol. FIGS. 3A and 3B show the analytical ion chromatograms (AIC) of a biodiesel sample derived from algal biomass and the biodiesel standard derived from soybean oil, respectively.

As seen in FIG. 3A, the biodiesel sample from the algal biomass was dominated by FAMEs of C16:0 (saturated fatty acid with 16 carbons) and C16:1 (singly unsaturated fatty acid with 16 carbons), accounting for 64% of the total FAMEs. The peak at 1045 s in the chromatogram is the internal standard added for quantification purposes (tetraosane). FAME C14:0 and C18:1 accounted for 33% of the total area, followed by a minor component of C18:0 with 3%.

As seen in FIG. 3B, the biodiesel from soybean oil showed similar composition with the sample, mainly containing C16:0, C18:0 and C18:1. Interestingly, acetic acid butyl ester at 260 s was also detected in the soybean biodiesel. The biodiesel derived from palm oil had a similar pattern as that from soybean oil (data not shown).

In additional experiments, tetraethylammonium hydroxide and tetrabutylammonium hydroxide (25% in methanol) were used as the alkylation reagent. These two reagents were tested under the same conditions as those used with the TMAH, using dried algae from the same source. These two reagents convert triglycerides to fatty acids ethyl esters and fatty acid butyl esters, respectively. Similar to TMAH, the dominant products are the ethyl or butyl esters of C14:0, 16:0 and 18:0 fatty acids. It should be noted, however, that the quality of ethyl or butyl esters may not be as good as the FAMEs because they are less volatile, which may make the combustion in the engine more difficult than FAMEs.

FAMEs yields were also tested with commercially available soybeans, corn oil, olive oil and sunflower oil. The soybeans were ground in a mortar and pestle, and 1 g of ground soybeans was loaded to the chemoreactor for biodiesel conversion. To obtain FAMEs from vegetable oils, only a small amount of vegetable oil is needed. A mini-reactor was used consisting of glass tubes as described by Chefetz B., Chen Y., Clapp C. E., Hatcher P. G., *Characterization of organic matter in soils by thermochemolysis using tetramethylammonium hydroxide (TMAH)*, SOIL SCI. SOC'Y OF AMN. J., 64 (2), 583-589 (2000). The FAME yields from the algae samples are similar (3-6%), whether the chemoreactor or the glass tubes are used, so the conversion of vegetable oil in the glass tubes is expected to be equivalent to that expected in the chemoreactor. Briefly, 2 μL of vegetable oil was mixed with 200 μL TMAH (25% in methanol). After the methanol was evaporated tinder $N_2$, the glass tube was sealed under vacuum. The glass tube was put in a furnace at 250° C. for half an hour. The FAMEs in the tube were rinsed out with ethyl acetate for GC-MS analysis.

The soybeans generated 2.2% FAMEs. This yield appeared to be low considering the high lipid contents in soybeans, about 20%. It is contemplated that the reason for the low yield is the use of the mortar and pestle, resulting in a coarse powder, effectively reducing the surface area of ground soy beans available to react. The corn, olive and sunflower oil were each converted to FAMEs resulting in a higher efficiency, ranging from 88-140%. This higher efficiency is expected because vegetable oil is miscible with TMAH in methanol. Therefore, the available surface area for the reaction is much higher, resulting in much higher conversion efficiency than that of the solids.

The overall similar mass spectrometry patterns between biodiesels available commercially and the biodiesel produced from the algal biomass suggest that the direct conversion process employed in the subject disclosure yields a nearly identical biodiesel to those available commercially. The procedure is robust and does not require extensive processing like that for the traditional process. It is a direct transesterification from solid to liquid biodiesel products, as well as liquid to liquid biodiesel products.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. All numerical ranges cited herein are inclusive of all values contained therein, and include both endpoints in a range.

What is claimed is:

1. A process for producing biodiesel comprising:
reacting a feed stock comprising a biomass and an alkylation reagent in a substantially oxygen free environment without a catalyst at a pressure and temperature sufficient to hydrolyze one or more lipid glycerides in the biomass and alkylate one or more fatty acids with methyl groups from the alkylation reagent in the reaction; and
recovering fatty acid alkyl esters from the reacted feed stock.

2. The process of claim 1, wherein the alkylation reagent is tetramethylammonium hydroxide and the recovered fatty acid alkyl esters are fatty acid methyl esters.

3. The process of claim 2, wherein the temperature is between about 250° C. and about 500° C. and the pressure is atmospheric.

4. The process of claim 1, wherein the biomass is an algal biomass.

5. The process of claim 4, wherein the algal biomass is a microalgal biomass.

6. The process of claim 5, wherein the microalgal biomass is dried or partially dried prior to reacting.

7. The process of claim 6, wherein the alkylation reagent is tetramethylammonium hydroxide.

8. The process of claim 7, wherein the temperature is between about 250° C. and about 500° C.

9. The process of claim 7, wherein the temperature is between about 400° C. and about 450° C.

10. The process of claim 1, wherein the fatty acid alkyl esters are recovered by condensation.

11. The process of claim 1, wherein at least one by-product of the processed alkylation reagent is converted and recycled into the feed stock.

12. The process of claim 2, wherein a trimethyl amine by-product of the processed tetramethylammonium hydroxide is converted and recycled into the feed stock.

13. The process of claim 7, wherein the ratio in grams of microalgal biomass to tetramethylammonium hydroxide is about 1:0.12.

14. The process of claim 1, wherein the alkylation reagent is selected from one or more of tetramethylammonium hydroxide, tetrabutylammonium hydroxide, trimethylphenylammonium hydroxide, tetraethyammonium hydroxide, and (m-trifluoro-methylphenyl)trimethylammonium hydroxide.

15. The process of claim 1, wherein the substantially oxygen free environment comprises less than or equal to two percent oxygen.

16. The process of claim 1, wherein the pressure is less than atmospheric.

17. The process of claim 1, wherein the pressure is greater than atmospheric.

18. A process for producing biodiesel, the process comprising:
reacting oil containing lipid glycerides with an alkylation reagent in a sufficient pressure and temperature to esterify the oil, wherein the reaction occurs without a catalyst in a substantially oxygen free environment; and
recovering fatty acid alkyl esters from the esterified oil.

19. The process of claim 18, wherein the alkylation reagent is tetramethylammonium hydroxide and the temperature is between about 250° C. and about 500° C.

20. The process of claim 18, wherein the alkylation reagent is selected from one or more of tetramethylammonium hydroxide, tetrabutylammonium hydroxide, trimethylphenylammonium hydroxide, tetraethyammonium hydroxide and (m-trifluoro-methylphenyl)trimethylammonium hydroxide.

21. A process for producing biodiesel from an algal biomass, the process comprising:
reacting a feed stock comprising an algal biomass and tetramethylammonium hydroxide in a substantially oxygen free environment without a catalyst at a temperature between about 250° C. and about 500° C., the reaction comprising hydrolyzing one or more lipid glycerides in the algal biomass and methylating one or more fatty acids in the reaction with methyl groups from the alkylation reagent;
recovering fatty acid methyl esters from the reacted feed stock; and
formulating the fatty acid methyl esters into biodiesel.

22. The process of claim 21, wherein the algal biomass is dried or partially dried prior to reacting.

23. The process of claim 21, wherein the fatty acid methyl esters are recovered by condensation.

24. The process of claim 21, wherein a trimethyl amine by-product from the processed tetramethylammonium hydroxide is converted and recycled into the feed stock.

25. The process of claim 21, wherein the temperature is between about 400° C. and about 500° C.

26. The process of claim 21, wherein the substantially oxygen free environment comprises less than or equal to two percent oxygen.

27. The process of claim 21, wherein the tetramethylammonium hydroxide is in solution with water.

28. The process of claim 21, wherein the tetramethylammonium hydroxide is in solution with methanol.

* * * * *